United States Patent
Copes et al.

(10) Patent No.: US 8,504,477 B1
(45) Date of Patent: Aug. 6, 2013

(54) SYSTEMS, METHODS AND COMPUTER PROGRAM PRODUCTS FOR AUTOMATING FINANCIAL INSTITUTION CLIENT POSITIVE PAY RETURN DECISIONS

(75) Inventors: Deborah A. Copes, Wethersfield, CT (US); Debra R. Murphy, Malden, MA (US); Ann M. Cromarty, Old Saybrook, CT (US); William A. Schauer, Preston, MD (US)

(73) Assignee: Bank of America Corporation, Charlotte, NC (US)

(*) Notice: Subject to any disclaimer, the term of this patent is extended or adjusted under 35 U.S.C. 154(b) by 563 days.

(21) Appl. No.: 12/437,189

(22) Filed: May 7, 2009

(51) Int. Cl.
*G06Q 40/00* (2012.01)
(52) U.S. Cl.
USPC .................... 705/44; 705/35; 705/39; 705/42
(58) Field of Classification Search
USPC .......................................... 705/35, 39, 42, 44
See application file for complete search history.

(56) References Cited

U.S. PATENT DOCUMENTS

| | | | | |
|---|---|---|---|---|
| 5,691,524 | A * | 11/1997 | Josephson | 705/40 |
| 7,640,205 | B2 * | 12/2009 | Michelassi et al. | 705/37 |
| 7,925,588 | B2 * | 4/2011 | Foth | 705/45 |
| 2003/0204475 | A1 * | 10/2003 | Cuda | 705/64 |
| 2004/0236688 | A1 * | 11/2004 | Bozeman | 705/42 |
| 2005/0015341 | A1 * | 1/2005 | Jackson | 705/45 |
| 2005/0137951 | A1 * | 6/2005 | Michelassi et al. | 705/35 |
| 2005/0246269 | A1 * | 11/2005 | Smith | 705/39 |

OTHER PUBLICATIONS

Deterring Check Fraud: The Model Positive Pay Services Agreement and Commentary. The Business Lawyer, vol. 54, No. 2 (Feb. 1999), pp. 637-684.*
CheckFree Improves Bank Reporting with CheckFree Positive Pay Accelerator™. PR Newswire (US). May 8, 2006.*

* cited by examiner

*Primary Examiner* — Scott Zare
(74) *Attorney, Agent, or Firm* — Michael A. Springs; Moore & Van Allen PLLC; James C. Edwards

(57) ABSTRACT

Systems, methods, and computer program products are provided for automatically processing positive pay return decisions. Positive pay return decisions are financial client decisions that authorize return of a pay item, such as a check, in the event that the client determines that the pay item warrants return, such as in the instance in which the check has been fraudulently altered or the like. Automated processing provides for deleting pay status from a service management system, creating a credit transaction to credit an appropriate demand deposit account and creating a return file that identifies the item and the reason for return.

33 Claims, 8 Drawing Sheets

SYSTEMS, METHODS AND COMPUTER PROGRAM PRODUCTS FOR AUTOMATING FINANCIAL INSTITUTION CLIENT POSITIVE PAY RETURN DECISIONS

FIELD

In general, embodiments herein disclosed relate to systems, methods, and computer program products for services provided to financial institution clients and, more specifically, automating the process related to client positive pay return decisions.

BACKGROUND

Financial institutions, such as banks and the like, offer account reconciliation services to various clients, such as small business clients, corporate clients, large commercial clients and the like. Account reconciliation benefits the client by having the financial institution reconcile accounts, or otherwise make certain that accounts are in balance. Thus, eliminating the need for the client to dedicate resources to accommodate this time-consuming task.

As part of the overall account reconciliation service or as a separate offering, many financial institutions also offer clients a fraud prevention service; commonly referred to by those skilled in the financial services area as a positive pay service. Most clients will issue paper-based checks in the course of their business. Positive pay service provides a means for identifying mismatches between what the client identifies as should be on the check and what actually shows up on the check during payment processing, and then allows the client to make a decision on whether to authorize payment on the check or to issue a return decision (i.e., payment denied).

According to many such positive pay services, a client will send the financial institution an issue file that lists all of the checks that are going to issue within an upcoming time frame, for example, the next day, week, month, etc. The issue file includes information found on the check, such as account number, serial number, amount or the like. Once the financial institution receives the check for payment, the financial institution matches up the information on the check versus the information provided in the issue file. As long as the information matches, the check is authorized for payment. However, in the event that the check does not match the information in the issue file, the client is given the opportunity to make a decision, referred to as a positive pay decision, as to whether to proceed with payment or whether to return the check as payment denied.

Typically, the financial institution implements a client access program to provide the client with the opportunity to make decisions on items that the financial institution has identified as potentially fraudulent (i.e., items in which the received check does not match the information in the client supplied issue file). The client must make a pay or return decision on all items identified by the financial institution within a specified time period in order for the financial institution to meet their right of return window. In most instances the right of return window is 24 hours in which the financial institution must return/deny payment and, if a return is not made within the return window, payment occurs. As such, if the client does not disposition an identified item within the specified time period, a default decision is applied to the item. While the client is typically afforded the option of making their default decision a pay decision or a return decision, in most instances, to insure against improperly authorizing payment, the default decision will be a return decision.

In practice, the client's specified time/deadline for making payment/return decisions is typically within a few hours of the financial institution's right of return window. Thus, if the client fails to make decisions on numerous identified items within their allotted time, causing the identified items to be classified as a default decision, and the client's default decision is a return decision, the financial institution must process the return within a short period of time to insure that the right of return window is still open. This same scenario presents itself if the client positively identifies numerous identified items as return decision and the decisions are made at or near the clients' allotted time for making such decisions.

Currently, once return decisions are received from the client (or default decisions that are associated with returns) the processing that proceeds is entirely manual and, therefore, unduly labor intensive. First, a financial institution representative monitors the receipt of decision reports from the client and from these reports identify those items having a return decision status. In practice, once these items have been identified the financial institution representative is required to manually enter account number and serial number in a service management system and create a credit adjustment in the service management system, which a supervisor then reviews. In addition, the representative must pull an image of the check being denied payment, write a return check ticket and communicate with the returns department, which further processes the return. In many instances, the manual nature of the return process creates a time-crunch problem for the financial institution because all of these manual processes must be completed prior to the expiration of the right of return window. This problem is exasperated if the client's return decisions or default decisions occur proximate the right of return window.

It should also be noted that in many instances financial institutions are able to charge a premium for their positive pay service because they insure against payment of fraudulent actions. In this regard, the financial institution becomes liable for mismatched information that the financial institution failed to identify as potentially fraudulent, items identified as potentially fraudulent but not communicated to the client for a decision process, potentially fraudulent items identified by the client as a return decision that the bank does not return and/or potentially fraudulent items identified by the client as a return decision that the bank does not meet the right of return window. Thus, if the financial institution is unable to process a client's request for return within the allotted right of return window, the financial institution may, based on service configuration, be liable for the payment amount. Additionally, the manual nature of the current process provides for many opportunities for human-error type defects due to incorrect entry of data and the like.

In addition, current methods are not readily conducive to providing an audit trail back to the external user/client representative that authorized the return decision. This type of audit trail information is not only invaluable to the accounts reconciliation processing operations, but is also valuable to the client services functions to research client's inquires and the like. From the reconciliation processing aspect, the audit trail provides a means to substantiate the clients' positive pay actions when authorizing return or payment of a potentially fraudulent item.

Therefore, a need exists to develop systems, method, computer program products and the like for automating the processing of financial institution client positive pay return decisions. The desired systems, methods and computer program products should alleviate problems related to manually processing client decisions within a short period of time in order to meet the right of return window. In addition, the desired systems, methods and computer program products should eliminate problems related to manual observation of return decisions and entry of data related to return decisions or associated default decisions, which may lead to returns being overlooked or improperly processed so as to result in payment. In addition, to defect-reduction, the desired systems, methods and computer program products should provide for efficiency and cost-savings by reducing the manual involvement required to process the positive pay return decisions. Additionally, the desired systems, methods and computer program products should provide for an enhanced audit trail that traces the positive pay decision back to the external user/client that made the return decision.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, devices, systems and computer program products are described herein that provide for automatically processing positive pay return decisions. Positive pay return decisions are financial client decisions that authorize return of a pay item, such as a check, in the event that the client determines that the pay item warrants return, such in the instance in which the check has been fraudulently altered or the like. Automated processing provides for deleting pay status from a service management system, creating a credit transaction to credit an appropriate demand deposit account, creating a return file that identifies the item and the reason for return and the like. By eliminating manual processing the financial institution lessens time constraints created by processing returns between the time allotted for client positive pay decisions and the right of return window for making such returns. In addition, the automated processing mitigates human-error defects that may lead to erroneously returning a valid pay item or failing to return a pay item that a client has designated for return.

A method for automated processing of positive pay return decisions defines a first embodiment of the invention. The method includes identifying one or more suspect, e.g., potentially fraudulent, pay items and providing the one or more suspect pay items to an associated financial institution client, i.e., the client that issued the pay items. The method further includes receiving decisions on the one or more suspect pay items from the client, such that one or more of the decisions is a return decision. Additionally, the method includes automatically processing the one or more return decisions including crediting the accounts associated with the one or more suspect pay items having the return decision.

According to specific embodiments of the method, automatically processing the return decisions further includes automatically deleting one or more pay items associated with the return decision from a database, such as a service management system database or the like, that indicates a paid status.

According to other specific embodiments of the method, automatically crediting the accounts associated with the pay items further includes automatically creating one or more credit transactions and automatically communicating the credit transactions to one or more demand deposit accounts associated with the one or more pay items having the return decision. In one further embodiment the credit transactions may be automatically communicated to the demand deposit accounts via a transaction exchange. The credit transactions may include an account number, a check serial number and an amount.

According to yet another specific embodiment of the method, automatically processing the return decisions may include automatically creating a return file that includes an identifier identifying the pay item being returned and a reason for the return and automatically communicating the return file to a return database.

In accordance with another specific embodiment of the method, identifying one or more suspect pay items further includes receiving a payment issue file from the financial institution client that includes information pertaining to a plurality of pending pay items and comparing the information in the payment issue file to information on received pay items to determine the one or more suspect pay items. In further embodiments of the method, providing one or more suspect pay items further comprises loading the one or more suspect pay items on a client access platform.

Yet another embodiment of the method includes failing to receive a decision on one or more of the suspect pay items within a predetermined allotted time limit, such that the failure to receive the decision automatically prompts a default decision. According to certain embodiments, the client has predefined the default decision as a return decision, such that the default decisions provide for the same automated processing, herein disclosed, that return decisions undergo.

An apparatus for automated processing of positive pay return decisions provides for another embodiment of the present invention. The apparatus includes a computing platform having at least one processor and a memory. The apparatus further includes a positive pay module stored in the memory, executable by the processor, and operable to reconcile client accounts. The positive pay module includes a suspect pay item identification sub-module operable to identify one or more suspect pay items and a suspect pay item client interface sub-module operable to present the one or more suspect pay items to an associated financial institution client. The positive pay module also includes a return decision processing sub-module operable to receive decisions, including return decisions, on the one or more suspect pay items from the client and automatically process the return decisions, including, automatically, crediting accounts associated with the one or more suspect pay items having the return decision.

According to specific embodiments of the apparatus, the return decision processing sub-module further includes a paid status deletion routine operable to automatically delete one or more pay items associated with the one or more return decisions from a database, such as a service management system database, that indicates a paid status for the pay item(s).

According to yet other specific embodiments of the apparatus, the return decision processing sub-module further includes a credit transaction routine operable to automatically create credit transactions and automatically initiate communication of the credit transactions to one or more demand deposit accounts associated with the suspect pay items having the return decision. In one such embodiment, automatically initiating communication of the credit transactions includes automatically initiating communication of the credit transactions via a transaction exchange to the one or more demand deposit accounts.

In still further specific embodiment of the apparatus, the return decision processing sub-module further includes a return file routine operable to automatically create a return file that includes an identifier identifying the pay item being returned and a reason for the return and automatically initiate communication of the return file to a return database.

In yet other embodiments of the apparatus, the suspect pay item identification sub-module is operable to receive a payment issue file from the financial institution client that includes information pertaining to a plurality of pending pay items and compare the information in the payment issue file to information on received pay items to determine the one or more suspect pay items. Additionally, the suspect pay item client interface sub-module may include a client access platform operable to provide for the loading of the one or more suspect pay items on the platform.

According to other embodiments of the apparatus, the positive pay module includes a default decision processing sub-module operable to provide a client-defined default decision to one or more of the suspect pay items not having a received client decision within a predetermined time limit, wherein the client-defined default decision may be one of a pay decision or a return decision. In such embodiments, in which the positive pay module includes a return decision processing sub-module, the return decision processing sub-module is operable to automatically process the default decisions defined by the client as a return decision.

A computer program product including a computer-readable medium defines yet another embodiment of the invention. The medium includes a first set of codes for causing a computer to identify one or more suspect pay items and a second set of codes for causing a computer to provide the one or more suspect pay items to an associated financial institution client. The medium additionally includes a third set of codes for causing a computer to receive decisions on the one or more suspect pay items from the client, such that one or more of the decisions is a return decision. Additionally, the medium includes a fourth set of codes for causing a computer to process, automatically, the one or more return decisions, including codes for causing the computer to credit one or more accounts associated with the one or more suspect pay items having the return decision.

In accordance with specific embodiments of the computer program product, the fourth set of codes is further operable to cause the computer to delete, automatically, one or more pay items associated with the one or more return decisions from a database, such as a service management system database, that indicates a paid status. In other specific embodiments, the fourth set of codes is further operable to cause the computer to create, automatically, one or more credit transactions and initiate, automatically, communication of the credit transactions, to one or more demand deposit accounts associated with the one or more pay items having the return decision. Additionally, according to other specific embodiments of the computer program product, the fourth set of codes is further operable to cause the computer to create, automatically, a return file that includes an identifier identifying the pay item being returned and a reason for the return and initiate communication of the return file to a return database.

Thus, methods, devices, systems and computer program products are described herein that provide for automatically processing positive pay return decisions. Positive pay return decisions are financial client decisions that authorize return (i.e., denial of payment) of a pay item, such as a check, in the event that the client determines that the pay item warrants return, such as in the instance in which the check has been fraudulently altered or the like. Automating the processing of positive pay return decision provides for, but is not limited to, deleting pay status from a service management system, creating a credit transaction to credit an appropriate demand deposit account, creating a return file that identifies the item and the reason for return and the like. By eliminating manual processing, the financial institution lessens time constraints created by manually processing returns between the time allotted for client positive pay decisions and the right of return window allotted for making such returns. In addition, the automated processing mitigates human-error defects that may lead to erroneously returning a valid pay item or failing to return a pay item that a client has designated for return.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
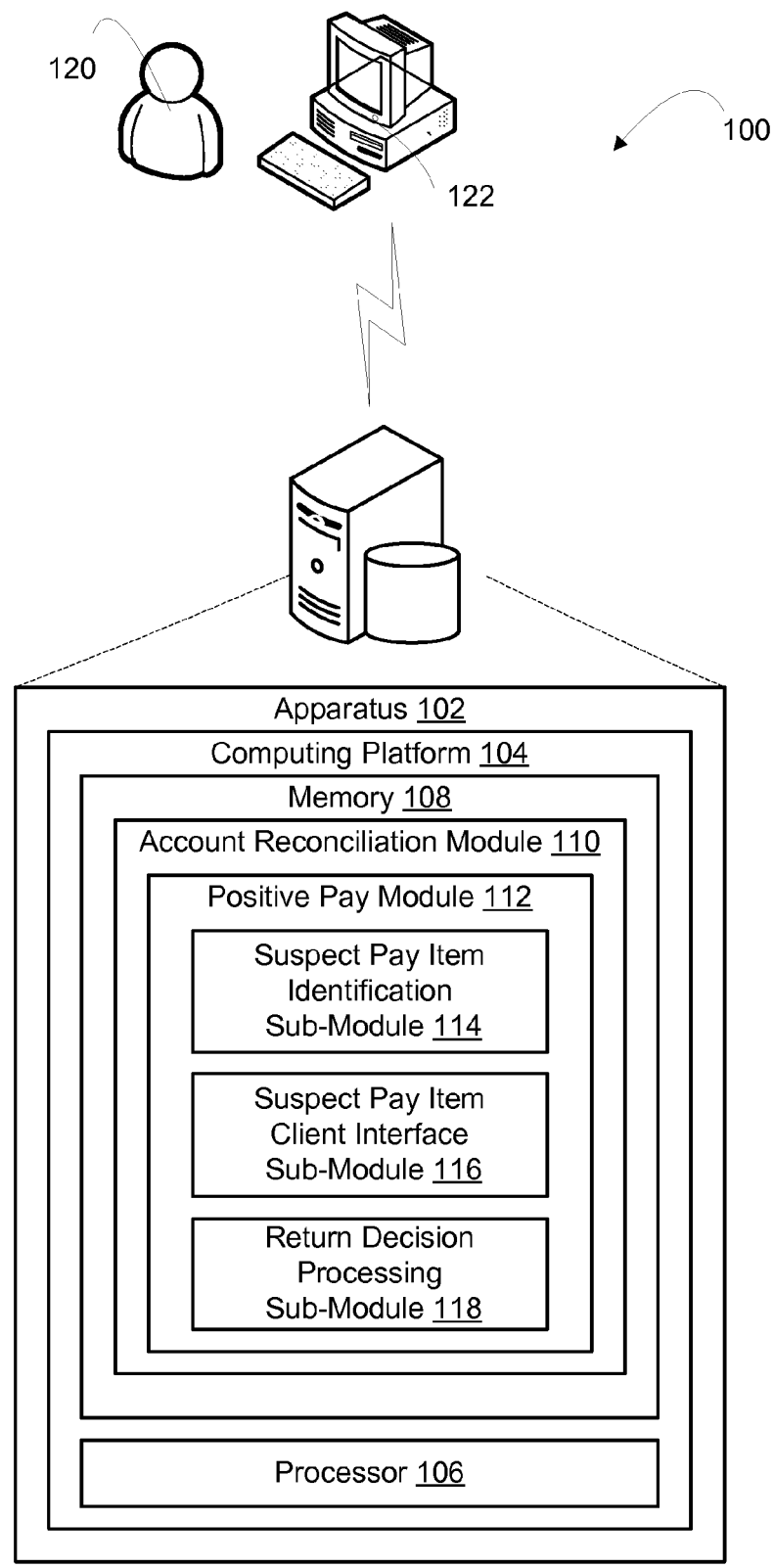
Figure 2:
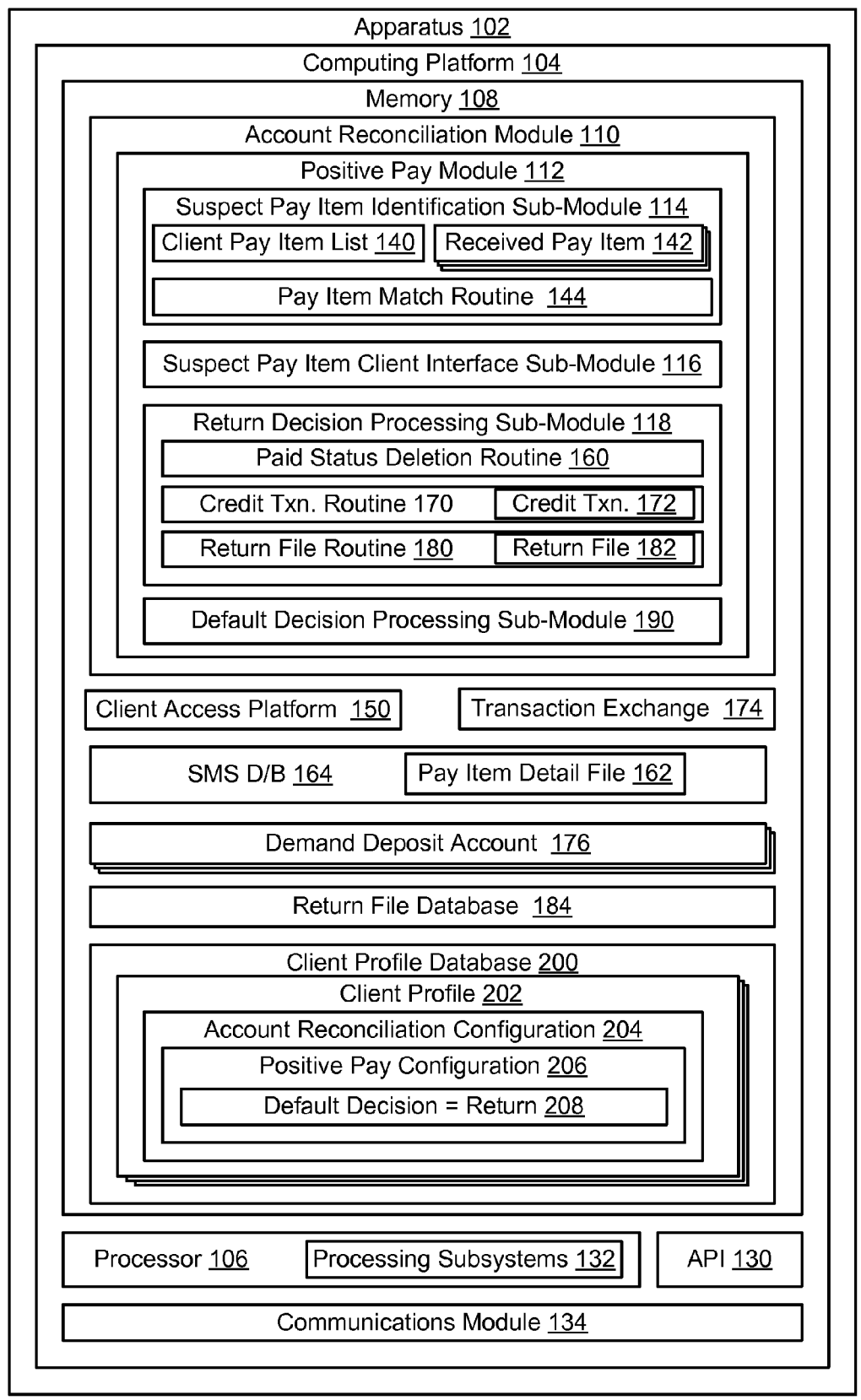

Having thus described embodiments of the invention in general terms, reference will now be made to the accompanying drawings, which are not necessarily drawn to scale, and wherein:

FIG. 1 is a block diagram of an apparatus configured for automated positive pay return decision processing, in accordance with one embodiment of the present invention;

FIG. 2 is a more detailed block diagram of an apparatus configured for automated positive pay decision processing, in accordance with an embodiment of the present invention.

Figure 3:
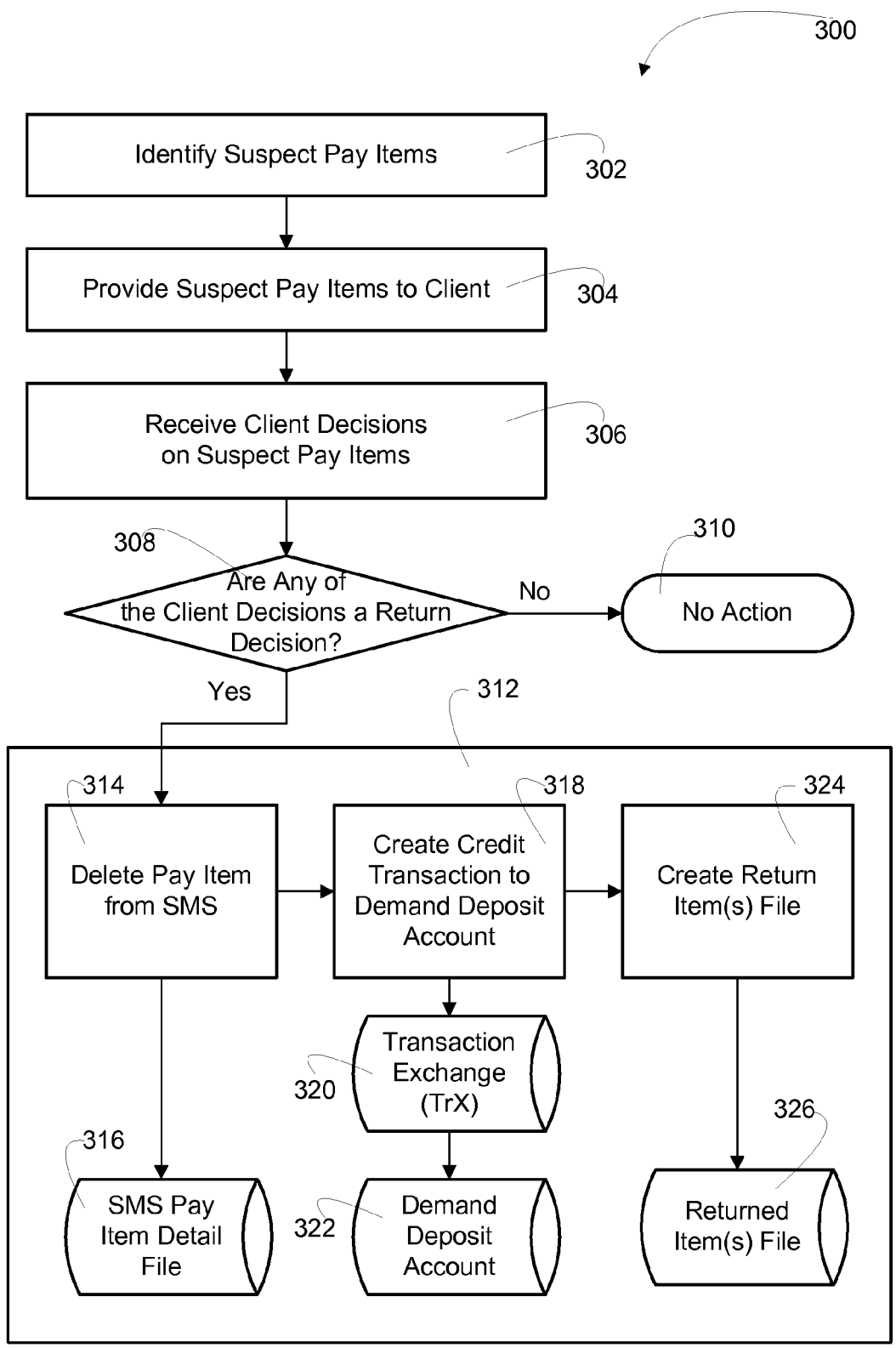
Figure 4:
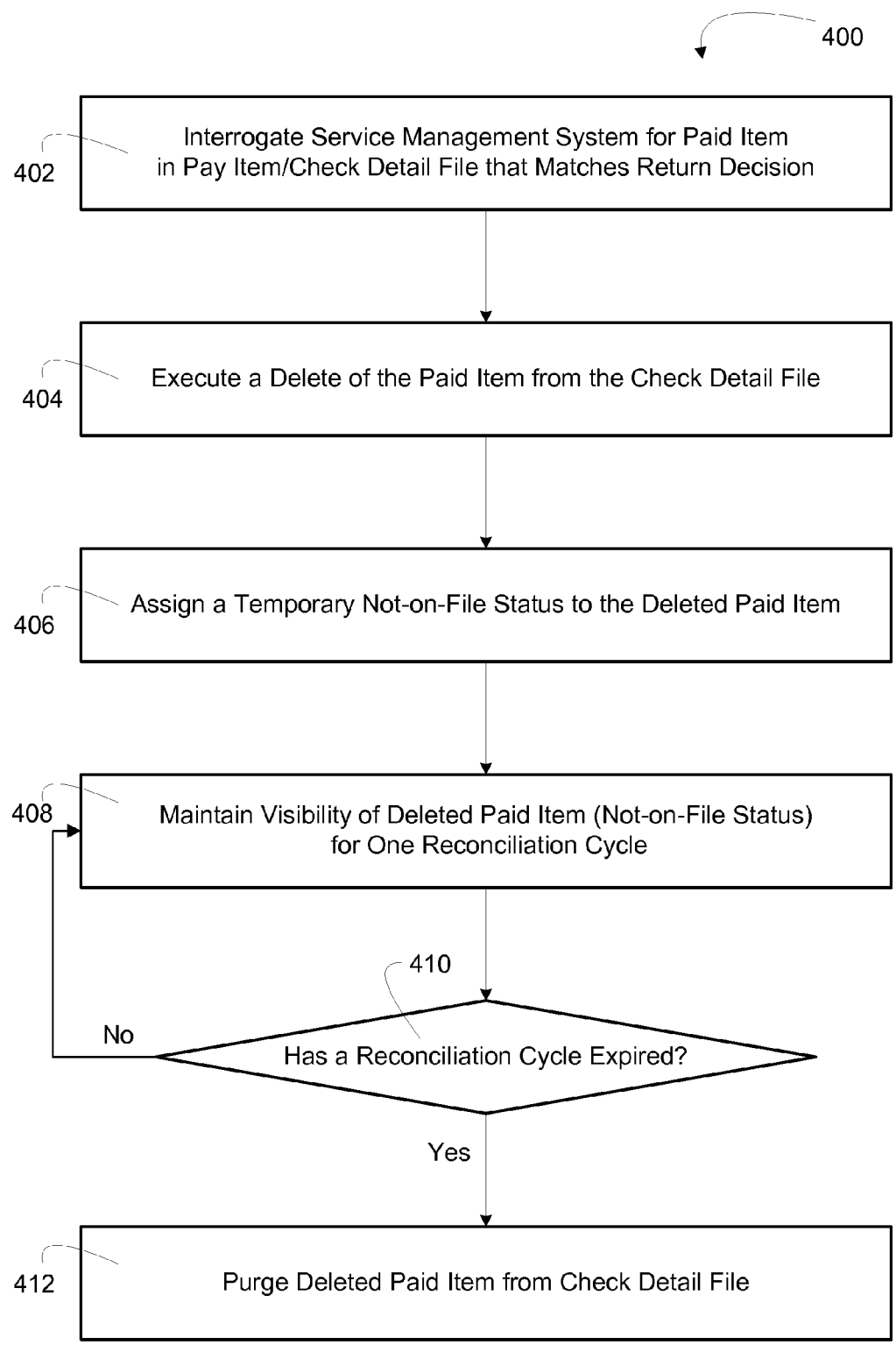
Figure 5:
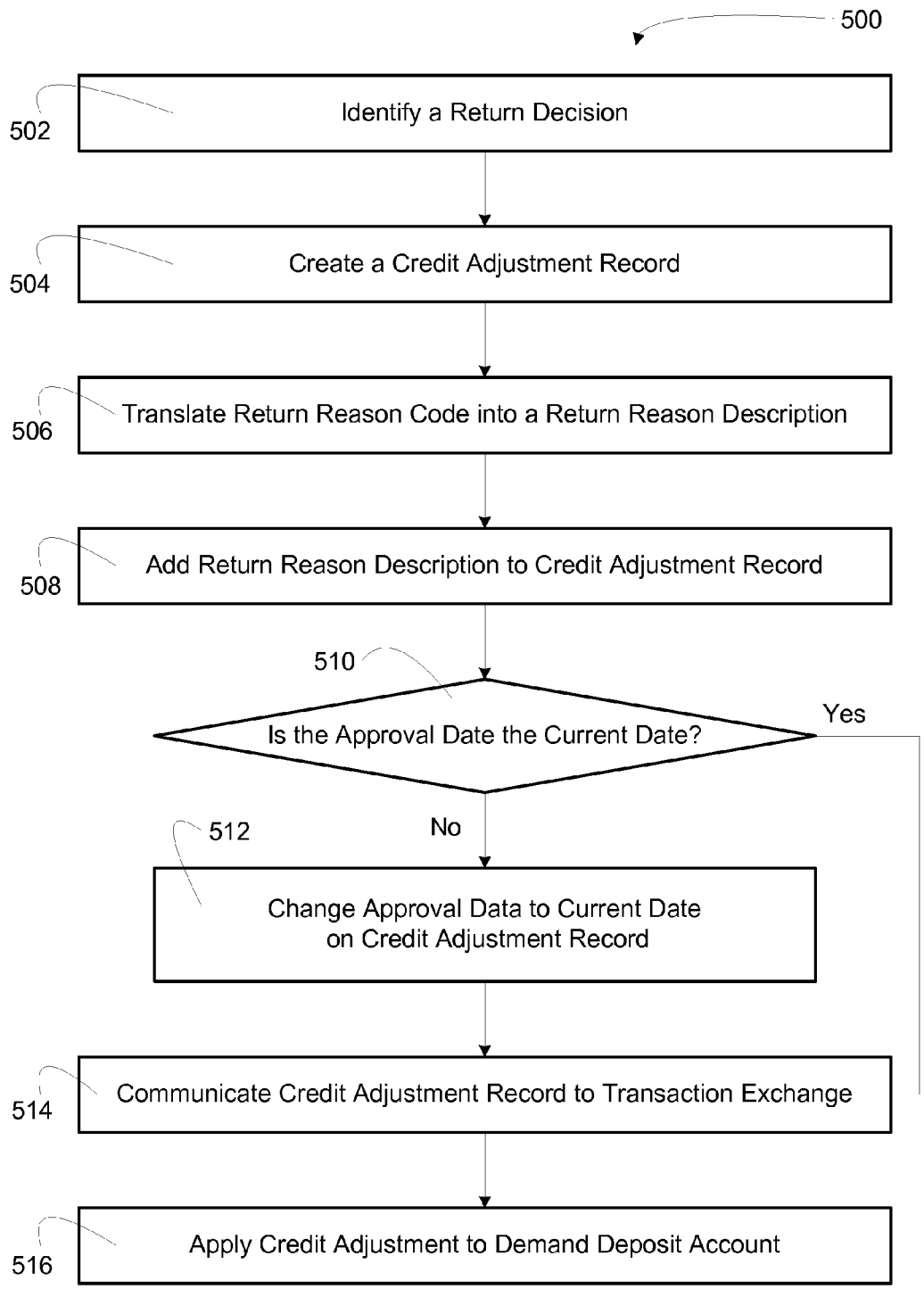
Figure 6:
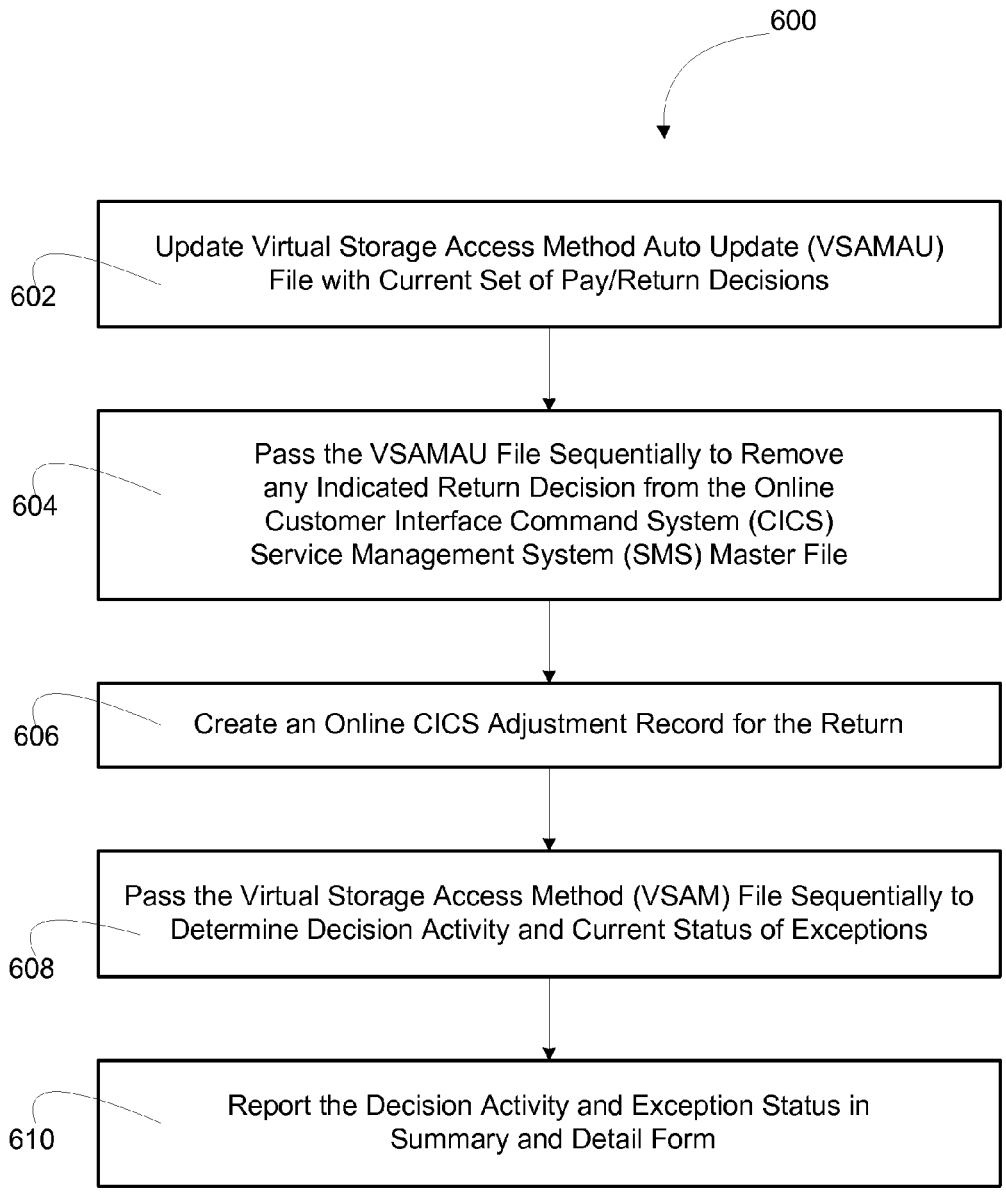
Figure 7:
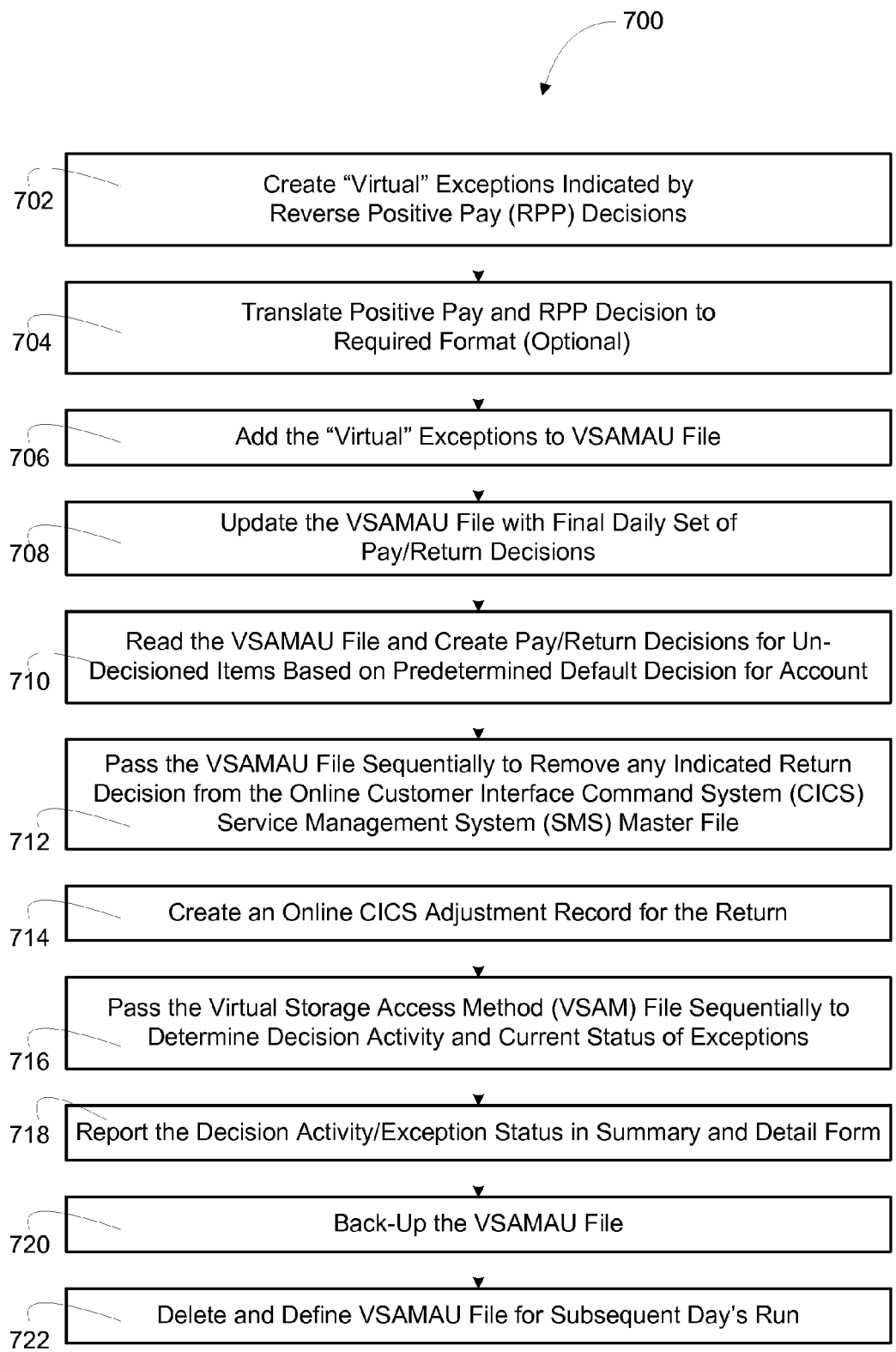
Figure 8:
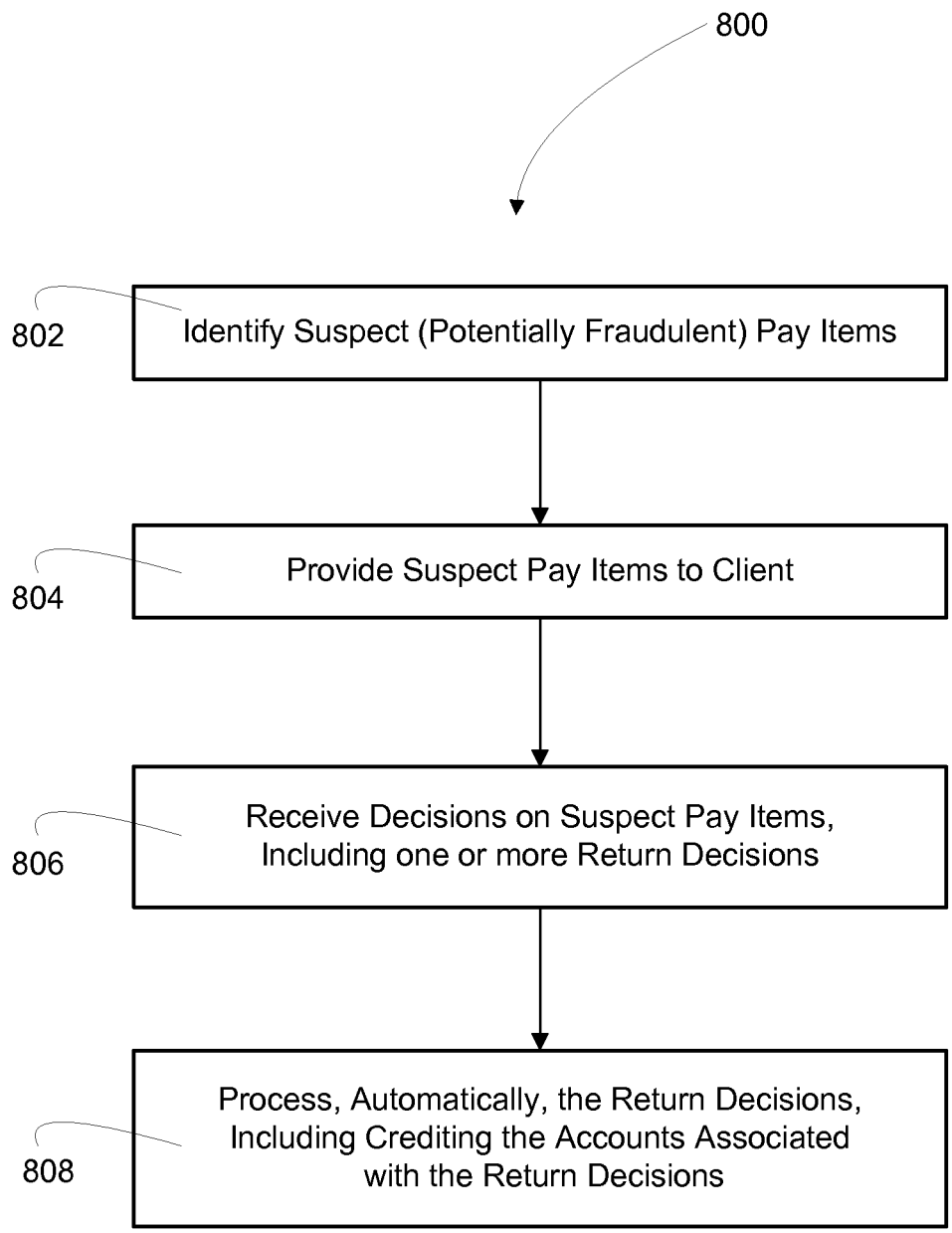

FIG. 3 is flow diagram of a method for automated positive pay decision processing, in accordance with one embodiment of the present invention;

FIG. 4 is flow diagram of a method for automatically deleting paid items from a service management system in response to return decisions, in accordance with an embodiment of the present invention;

FIG. 5 is a flow diagram of a method for automatically creating credit transactions in response to return decisions, in accordance with an embodiment of the present invention;

FIG. 6 is a flow diagram of a method for automatically creating intra-day return pay item reports in response to return decisions, in accordance with an embodiment of the invention FIG. 7 is a flow diagram of a method for automatically creating end-of-day return pay item reports in response to return decisions and default decisions, in accordance with an embodiment of the present invention; and FIG. 8 is a flow diagram of a method for automated positive pay return decision processing, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems or apparatus that may include a number of devices, components, modules, and the like. It is to be understood and appreciated that the various systems or apparatus may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, apparatus, systems and computer program products are described herein that provide for automating clients' positive pay return decisions. As previously noted, positive pay is an anti-fraud service offered by financial institutions, such as banks or the like, to protect clients and the financial institutions against altered checks and/or counterfeit check fraud.

In practice, the client transmits a list of checks that will be issued in the near-term or checks that have recently issued, including account numbers, serial numbers, and amount. Subsequently, when the checks are presented to the financial institution for payment, the financial institution matches each check against the previously received client list. If the presented check numbers and amounts match those on the previously submitted list, the check is sent through for payment. In certain instances, if one or more of the items on the check do not match the items presented on the client list, the client is notified for the purpose of making a decision on the pay item/check. The mismatch of information between the received check and the clients presented list means that the check is suspect or otherwise potentially fraudulent. The client may determine that the mismatch is erroneous, inconsequential or otherwise does not effect payment of the check, in which case the client will decision the pay item as "pay". Since in most instances payment processing occurs in parallel with positive pay decision processing, no action is required if the client determines that payment is warranted. If the client determines that the mismatch is an error that warrants payment to be stopped, for example, a fraudulent action is deemed to have occurred, the client will decision the pay item/check as "return".

It is also noted that since payment processing occurs in parallel with positive pay processing, the financial institution has a finite time in which they can affect payment stoppage of a pay item. This is referred to in the industry and herein as the "right of return window". Once the window expires, the financial institution can no longer stop payment of the pay item. As such, the financial institution must create a deadline for the client's to decision the mismatched/suspect pay items. If the client does not respond with a decision within their allotted time period, the decision is deemed to be a default decision. The financial institution provides for the client to define their default decision as being either pay or return, although in most instances, to insure against improper payments, the client will designate the default as return.

Since the clients' deadline for responding to positive pay decisions is typically proximate (e.g., within a few hours) to the right of return window, if processing of the return decision requires various different functions to be performed manually, persistent problems occur, such as inevitable human-errors, insuring that the returns are processed within allotted time and the like.

In accordance with present embodiments of the invention, automating the processing of positive pay return decisions eliminates the possibility of human errors occurring, such as failing to return/stop payment on a pay item which the client decisions as such and/or returning/stopping payment on a pay item which does not require such or which the client has not authorized for return. Additionally, automated processing mitigates problems related to meeting time deadlines and, as such, provides for a less labor-intensive and more cost efficient process.

Referring to FIG. 1 a block diagram is depicted of a system 100 for automated positive pay return decisioning, in accordance with an embodiment of the present invention. The system 100 includes apparatus 102 configured to provide for automated processing of positive pay return decisions. As previously noted apparatus 100 may include one or multiple devices. In multiple device embodiments, the devices may be in networked communication with one another. Apparatus 100 includes a computing platform 104 having at least one processor 106 and a memory 108.

Memory 108 of apparatus 102 includes an account reconciliation module 110 that provides for a financial institution to offer an account reconciliation service to clients, such as corporate/business clients. The reconciliation service generally provides for the financial institution to insure that the clients' accounts are properly balanced. In addition, the account reconciliation service, may also provide for a positive pay service, whereby suspect (e.g., potentially fraudulent) pay items/checks are brought to the attention of the client for the purpose of the client making a pay/return decision on the suspect pay items. Thus, account reconciliation module 110 may include positive pay module 112. It should be noted that the positive pay service may be provided by the financial institution outside of the context of the account reconciliation service and, therefore, for the purposes of the invention, the account reconciliation module is deemed an optional element that is required in all embodiments of the invention.

The positive pay module 112 includes suspect pay item identification sub-module 114 operable to identify pay items, such as checks or the like that may be potentially fraudulent or for some other reason the payment on the item is suspect or otherwise deemed to be in question. According to one embodiment of the invention the suspect pay item identification sub-module 114 received client submitted listings of pending or issued pay items/checks, including information pertaining to the pay items, such as account number, serial numbers and amounts and compares the listings to pay items received for payment to determine if a mismatch exists.

The positive pay module 112 additionally includes suspect pay client interface sub-module 116 operable to provide for presenting the suspect pay items to the client for decisioning and receiving the related client decision responses. In accordance with an embodiment of the present invention, the suspect pay client interface sub-module 116 may implement a client access platform, such as financial institution-implemented client access platform or the like, as the platform for presenting the suspect pay items to the client 120, which accesses the platform via computing device 122, and for receiving client decisions/responses to the identified suspect pay items.

In accordance with present embodiments of the invention, the positive pay module 112 additionally includes a return processing sub-module 118 operable to automatically process positive pay return decisions, and/or default decisions associated with return decisions. Automatic processing includes crediting the account associated with the return pay item/check. In accordance with specific embodiments, automatic processing of the return decision includes, but is not limited to, deleting the paid status of the pay item from a database, such as a service management system database implemented in conjunction with the accounts reconciliation system. In addition, according to further specific embodiments, automatic processing of the return decision includes automatically creating a return file that includes a pay item identifier and the reason for the return and initiating the communication of the return file to a returns department/database.

According to other specific embodiments of the invention, the return processing sub-module 118 is operable automatically create credit transactions and initiate communication of the credit transactions, via a transaction exchange or the like, to one or more demand deposit accounts associated with the one or more suspect pay items. The credit transactions including an account number, a check serial number and an amount.

FIG. 2 provides a more detailed depiction of the apparatus 102, according to further embodiments of the present invention. In addition to providing greater detail, FIG. 2 highlights various optional embodiments. The apparatus 102 may include any type and/or combination of one or more computing devices, such as servers, a personal computers, or the like. The computing platform 104 is operable to receive and execute modules, routines and applications, such as account reconciliation module 110, positive pay module 112 and the like. Computing platform 104 includes memory 108, which may comprise volatile and nonvolatile memory such as read-only and/or random-access memory (RAM and ROM), EPROM, EEPROM, flash cards, or any memory common to computing platforms. Further, memory 108 may include one or more flash memory cells, or may be any secondary or tertiary storage device, such as magnetic media, optical media, tape, or soft or hard disk.

Further, computing platform 104 also includes processor 106, which may be an application-specific integrated circuit ("ASIC"), or other chipset, processor, logic circuit, or other data processing device. Processor 106 or other processor such as ASIC may execute an application programming interface ("API") layer 130 that interfaces with any resident programs, such as account reconciliation module 110, positive pay module 112 or the like, stored in the memory 108 of apparatus 102.

Processor 106 includes various processing subsystems 132 embodied in hardware, firmware, software, and combinations thereof, that enable the functionality of apparatus 100 and the operability of the apparatus on a network. For example, processing subsystems 132 allow for initiating and maintaining communications, and exchanging data, with other networked devices. It should be noted that any of the modules, sub-modules, and routines shown and described as being in memory 108 may alternatively be embodied in processing subsystems 132.

The memory 108 of apparatus 102 includes account reconciliation module 110 that provides for a financial institution to offer an account reconciliation service to clients, such as corporate/business clients. The account reconciliation module 110 includes positive pay module 112. As previously noted, in certain embodiments of the invention, the positive pay service and, thus, positive pay module 112 may be provided for outside of the context of an account reconciliation service. In such embodiments, the account reconciliation module 110 is obviated 110. In addition, the account reconciliation service, may also provide for a positive pay service, whereby suspect (e.g., potentially fraudulent) pay items/checks are brought to the attention of the client for the purpose of the client making a pay/return decision on the suspect pay items.

The positive pay module 112 is operable to identify and provide to the associated client suspect pay items/checks (i.e., potentially fraudulent pay items/checks) and allow for the client to make pay or return decisions on the suspect items. If the client determines that the suspect item/check should be returned (e.g., payment processing stopped), the present invention provides for automatically processing the return decision.

Thus, positive pay module 112 includes suspect pay item identification sub-module 114 operable to identify pay items, such as checks or the like, which may be potentially fraudulent or may, for some other reason, warrant return. According to one embodiment of the invention the suspect pay item identification sub-module 114 is operable to receive a client pay item list 140 that includes a listing of issued or soon-to-issue pay items/checks, including the serial number, account number and amount. In turn, the financial institution receives pay items 142 and applies pay item match routine 144 to determine if pay items match and, if they do match, whether any of the information (e.g., account number, serial number, amount) listed in the client pay item list 140 mismatches the corresponding information on the received pay item/check. If a mismatch is determined this pay item is deemed to be a suspect pay item that requires pay/return decisioning by the client.

The positive pay module 112 additionally includes suspect pay client interface sub-module 116 operable to provide for presenting the suspect pay items to the client for decisioning and receiving the related client decision responses. In accordance with an embodiment of the present invention, the suspect pay client interface sub-module 114 may implement a client access platform 150, such as financial institution-implemented client access platform or the like, as the platform for presenting the suspect pay items to the client and for receiving client decisions/responses to the identified suspect pay items. It is also noted that the suspect pay client interface sub-module 116 may implement other electronic means to communicate the suspect pay items to the client and receive client decisions, such as email communication, wireless communication or the like.

In accordance with present embodiments of the invention, the positive pay module 112 additionally includes a return processing sub-module 118 operable to automatically process positive pay return decisions, and/or default decisions associated with return decisions. Automatic processing includes crediting the account associated with the return pay item/check.

In accordance with specific embodiments, return processing sub-module 118 includes paid status deletion routine 160 operable to delete the paid status of the pay item from a database. In on embodiment of the invention, the paid status deletion routine 150 is operable to automatically delete the paid status from a pay item/check detail file 162 in a service management system database 164 that is implemented in conjunction with the accounts reconciliation system.

In addition, according to further specific embodiments, return processing sub-module 118 includes credit transaction routine 170 that is operable to automatically create credit transactions 172 and initiate communication of the credit transactions, via a transaction exchange 174 or the like, to the demand deposit accounts 176 associated with the suspect pay items identified as requiring return. Accordingly, the credit transaction may include the account number of the account to be credit and an amount.

Additionally, according to still further specific embodiments, return processing sub-module 118 includes return file routine 180 operable to automatically create a return file 182 that includes a pay item identifier and the reason for the return and initiating the communication of the return file to a return file database 184.

According to other specific embodiments of the invention, the positive pay module 112 includes a default decision processing sub-module 190 operable to automatically determine default decisions and the client's predetermined decision (i.e., either pay or return) corresponding to the default decision. In this regard, the default decision processing sub-module 190 applies a predetermined deadline to decision requests and if a client response/decision is not received within the allotted predetermined time period, the suspect pay item is determined to be a default decision. The default decision processing sub-module 190 is further operable to access the client profile database 200, which includes client profiles 202 to determine the client's default status. Accordingly, the client profile may include account reconciliation configuration 204 and/or positive pay configuration 206 that indicates the default decision 208. In instances in which the default decision is return, the default decision is processed automatically as described in relation to return decision processing sub-module 118.

FIG. 3 provides a flow diagram of a method 300 for automatically processing positive pay return decisions, in accordance with an embodiment of the present invention. At Event 302, suspect (i.e., potentially fraudulent or the like) pay items/checks are identified. According to one embodiment of the invention, suspect pay items/checks are identified by comparing check number, account number, amount or the like of issued pay items/checks, as supplied by a client listing of such, to financial institution-received pay items/checks being processed for payment. Pay items are identified as suspect if one or more of the numbers or amount differs from that found on the received pay item/check.

At Event 304, the suspect pay items are presented to the associated client. According to one embodiment of the invention, a client access platform is implemented to provide the client access to the suspect pay items/checks and to allow the client the ability to decision the pay items as either pay or return.

At Event 306, client decisions are received for the suspect pay items/checks and at Decision 308, a determination is made as to whether any of the client decisions are return decisions. If one or more of the client decisions for the suspect items is determined to not be a return decision, in other words one or more of the client decisions is determined to be a pay decision, at Event 310, no further action is taken on the pay decisions. As previously noted payment processing typically occurs in parallel with positive pay processing, such that payment processing will proceed unless an indication is provided to stop payment processing.

If a determination is made that one or more of the client decisions are return decisions, at Event 312, automatic processing of the return decisions ensues. At Event 314, the paid status of the pay item is deleted from a corresponding Service Management System (SMS) pay item detail file (Data 316). Deletion of the paid status prevents further payment processing from occurring.

At Event 318, a credit transaction is automatically created and communicated to a corresponding Demand Deposit Account (DDA) (Data 322). In accordance with an embodiment, the communication of the credit transaction to the DDA (Data 322) is conducted via Transaction eXchange (TrX) (Data 324). In certain embodiments of the invention, the credit transaction may warrant a supervisory approval or the like, prior to processing the credit transaction.

At Event 324, a return item file (Data 326) is created, which may include a pay item identifier and the reason for the return. The return item file (Data 326) is subsequently communicated to a return database associated with a return service department.

Referring now to FIG. 4, a flow diagram is provided of a method 400 for automatically deleting the paid status of a return decisioned pay item, according to another embodiment of the invention. At Event 402, the service management system is interrogated to retrieve the pay item/check detail file that matches the pay item in the return decision and, at Event 404, a Service Management System (SMS) routine is called-up to delete the item in the corresponding pay item/check detail file.

In conjunction with the execution of the deletion of the item from the pay item/check detail file, at Event 406, a temporary "not-on-file" status is assigned to the deleted paid item. At Event 408, the visibility of the deleted paid item is maintained, with the "not-on-file" status visible, for one reconciliation cycle. The reconciliation cycle may be any predetermine time period. At Decision 410, a determination is made as to whether the reconciliation cycle has expired. If the reconciliation cycle has not expired then, at Event 408, the visibility of the deleted paid item is maintained. If the reconciliation period has expired then, at Event 412, the deleted paid item is purged from the check detail file and visibility, in the form of the "not-on-file" status, is no longer maintained in the file.

Turning the reader's attention to FIG. 5, a flow diagram is presented of a method 500 for automatically creating a credit transaction, in accordance with another embodiment of the invention. At Event 502, a return decision is identified. The return decision may be identified based on a client's decision returned to the financial institution or, in the event that a client's decision is not returned within the allotted time period for responding, the return decision may be identified based on a default decision.

At Event 504, based on the identification of the return decision, a credit adjustment record is automatically created in the adjustment file. The credit adjustment record includes the account to be credited and the amount. At Event 506, the return reason code is translated into a return reason description. The return reason code is typically provided for by the client via the client-access platform or, in the instance in which, the return decision is based off of a default decision, the return reason code may indicate default. At Event 508, the return reason descriptor is added to the credit adjustment record.

At Decision 510, a determination is made as to whether the approval date on the credit adjustment record is the current date. The approval date needs to be the current date in order for the credit transaction to be extracted for inclusion on the transaction exchange file. If the approval date is not the current date, at Event 512, the approval date is changed to the current date. If the approval date is the current date or once the approval date has been changed to the current date, at Event 514, the credit adjustment is communicated to the transaction exchange and, at Event 516, the credit adjustment is applied to the corresponding demand deposit account.

Referring to FIG. 6, a flow diagram is depicted of a method 600 for automatically processing return decisions as they are received from a customer access platform, in accordance with an embodiment of the present invention. At Event 602, Virtual Storage Access Method Auto Update (VSAMAU) files are updated with the current set of pay/return decisions returned from the customer access platform. The VSAMAU file is created for each client response period, for example, if the client response period is a business day, a VSAMAU file is created each business day with one record for each positive pay item reported from the client via the client-access platform.

Once the VSAMAU is updated, at Event 604, the VSAMAU file is passed sequentially to remove any indicated return decision from the online Customer Information Control System (CICS), Service Management System (SMS) master file. In practice, a batch utility is implemented to start a CICS background task, the task opens the VSAM file, reads each new decision and attempts to apply the decision, if the decision is a return decision, to the service management system. At event 606, the result of each update to the service management system is recorded in the VSAM file as an online CICs adjustment record.

At Event 608, the VSAMAU file is again sequentially passed to determine decision activity and to report the current status of each exception. After all of the decision records have been processed, the CICS task closes the VSAM file.

At Event 610, a batch reporting program is implemented to create an intra-period/intra-day report of all pay/return decisions that have been applied and the exception status. The report may be in summary form and/or in detail form.

FIG. 7 provides a flow diagram 700 of a method for automatically processing return decisions as they are received from a customer access platform and automatic default decision processing, in accordance with an embodiment of the present invention. The flow of FIG. 7 provides for automatic process at the end of a client response period, for example, if the client response period is a business day, the processing occurs at the end of the business day once the client's period for response has expired.

At Event 702, "virtual" exceptions are created as indicated by reverse positive pay decisions received from the client via the client access platform. At optional Event 704, the positive pay decisions and the reverse positive pay decisions are translated to a suitable format is the client access format warrants such translation.

At Event 706, the "virtual" exceptions are added to the VSAMAU file and, at Event 708, Virtual Storage Access Method Auto Update (VSAMAU) files are updated with the current set (i.e., the final period/daily set) of pay/return decisions returned from the customer access platform.

At Event 710, the VSAMAU file is read and pay/return decisions are created for un-decisioned items based on the clients predetermined default decision settings. In one embodiment of the invention, the default decision may be located in the account's profile record located in the Quality Management System (QMS) master file.

At Event 712, the VSAMAU file is passed sequentially to remove any indicated return decision from the online Customer Information Control System (CICS), Service Management System (SMS) master file. In practice, a batch utility is implemented to start a CICS background task, the task opens the VSAM file, reads each new decision and attempts to apply the decision, if the decision is a return decision, to the service management system. At event 714, the result of each update to the service management system is recorded in the VSAM file as an online CICs adjustment record.

At Event 716, the VSAMAU file is again sequentially passed to determine decision activity and to report the current status of each exception. After all of the decision records have been processed, the CICS task closes the VSAM file.

At Event 718, a batch reporting program is implemented to create an intra-period/intra-day report of all pay/return decisions that have been applied and the exception status. The report may be in summary form and/or in detail form. At Event 720, a back-up VSAMAU file is created and, at Event 722, the contents of the VSAMAU file are deleted and a new file defined for the subsequent period/day's run.

Finally, turning to FIG. 8, a flow diagram is depicted of a method 800 for automatically processing positive pay returns, according to an embodiment of the present invention. At Event 802, suspect, e.g., potentially fraudulent, pay items are identified, According to one embodiment of the invention, suspect pay items may be identified by receiving a payment issue file from the financial institution client that includes information pertaining to pending or recently issued pay items and comparing the information in the payment issue file to information on received pay items. If a mismatch exists between the information in the client-supplied list and the information on the received pay item/check, the pay item is deemed to be suspect.

At Event 804, the suspect pay items are provided to an associated financial institution client, i.e., the client that issued the pay items. According to certain embodiments, the suspect pay items may be provided to the client via a client access platform or the like, which allows for the client to readily access the suspect pay items are provide decisions on the pay items.

At Event 806, decisions are received on the suspect pay items. Decisions on the suspect pay items may further include default decisions received on un-decisioned suspect pay items based on expiration of the clients' allotted time for responding to the decision process.

At Event 808, the return decisions are automatically processed, including crediting the accounts associated with the return decisions. According to specific embodiment of the invention, automatically processing may include deleting pay items associated with the return decision from a database, such as a service management system database or the like, that indicates a paid status. Further, automatically processing may include creating credit transactions and automatically communicating the credit transactions to one or more demand deposit accounts associated with the one or more pay items having the return decision. According to yet another specific embodiment of the invention, automatically processing the return decisions may include automatically creating a return file that includes an identifier identifying the pay item being returned and a reason for the return and automatically communicating the return file to a return database.

Thus, methods, devices, systems and computer program products described herein that provide for automatically processing positive pay return decisions. Positive pay return decisions are financial client decisions that authorize return (i.e., denial of payment) of a pay item, such as a check, in the event that the client determines that the pay item warrants return, such in the instance in which the check has been fraudulently altered or the like. Automating the processing of positive pay return decision provides for, but is not limited to, deleting pay status from a service management system, creating a credit transaction to credit an appropriate demand deposit account, creating a return file that identifies the item and the reason for return and the like. By eliminating manual processing, the financial institution lessens time constraints created by manually processing returns between the time allotted for client positive pay decisions and the right of return window allotted for making such returns. In addition, the automated processing mitigates human-error defects that may lead to erroneously returning a valid pay item or failing to return a pay item that a client has designated for return.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for automated processing of positive pay return decisions, the method comprising:
   identifying, by a computing device processor, one or more suspect pay items by receiving a payment issue file, from a financial institution client, which includes information pertaining to a plurality of pending pay items and comparing the information in the payment issue file to information on received pay items;
   providing, by a computing device processor, the one or more suspect pay items to a financial institution client;
   receiving, at a computing device, decisions on the one or more suspect pay items from the client, wherein one or more of the decisions is a return decision; and
   processing, automatically, by a computing device processor, the one or more return decisions at the financial institution, wherein processing includes:
   crediting one or more accounts associated with the one or more suspect pay items based on the one or more return decisions received from the client, and
   deleting one or more pay items associated with the one or more return decisions from a database that indicates a pay status, wherein deleting includes:
   assigning a temporary "not-on-file" status to each of the one or more pay items requiring deletion,
   maintaining visibility of the "not-on-file" status for a reconciliation cycle, and
   upon expiration of the reconciliation cycle, deleting the pay item from the database and removing visibility of the "not-on-file" status.

2. The method of claim 1, wherein deleting the one or more pay items further comprises deleting, by the computing device processor, the one or more pay items from a service management system database.

3. The method of claim 1, wherein crediting one or more accounts associated with the one or more pay items further comprises creating, automatically, by a computing device processor, one or more credit transactions and communicating, automatically, by a computing device processor, the credit transactions, to one or more demand deposit accounts associated with the one or more pay items having the return decision.

4. The method of claim 3, wherein creating further comprises creating, automatically, by the computing device processor, the one or more credit transactions, wherein the credit transactions include an account number, a check serial number and an amount.

5. The method of claim 3, wherein creating, further comprises creating, automatically, by the computing device processor, based on deletion of one or more pay items each associated with the one or more return decisions from a database that indicates a pay status, one or more credit transactions.

6. The method of claim 3, wherein communicating further comprises communicating, automatically, by the computing device processor, the credit transactions via a transaction exchange to the one or more demand deposit accounts.

7. The method of claim 1, wherein processing, automatically, the one or more return decisions further comprises creating, automatically, by a computing device processor, a return file that includes an identifier identifying the pay item being returned and a reason for the return.

8. The method of claim 7, further comprising communicating, automatically, by a computing device processor, the return file to a return database.

9. The method of claim 1, wherein providing one or more suspect pay items further comprises loading, by a computing device processor, the one or more suspect pay items on a client access platform.

10. The method of claim 1, further comprising failing to receive, at a computing device, a decision on one or more of the suspect pay items within a predetermined time limit, wherein the failure to receive the decision automatically prompts a default decision, and wherein the client has predetermined their default decision as the return decision.

11. The method of claim 1, further comprising creating, automatically, by a computing device processor, an audit report that includes client decisions and default decisions for the suspect pay items.

12. An apparatus for automated processing of positive pay return decisions, the apparatus comprising:
a computing platform including at least one processor and a memory;
a positive pay module stored in the memory, executable by the processor, operable to provide positive pay processing for financial institution clients and including:
a suspect pay item identification sub-module operable to identify one or more suspect pay items by receiving a payment issue file, from a financial institution client, which includes information pertaining to a plurality of pending pay items and comparing the information in the payment issue file to information on received pay items;
a suspect pay item client interface sub-module operable to present the one or more suspect pay items to an associated financial institution client and receive decisions on the one or more suspect pay items from the client, wherein the decisions include return decisions; and
a return decision processing sub-module operable to process, automatically, the one or more return decisions, wherein processing includes, automatically, crediting one or more accounts associated with the one or more suspect pay items based on the one or more return decisions received from the client and including,
a pay status deletion routine operable to delete, automatically, one or more pay items associated with the one or more return decisions from a database that indicates a pay status by (1) assigning a temporary "not-on-file" status to each of the one or more pay items requiring deletion, (2) maintaining visibility of the "not-on-file" status for a reconciliation cycle, and (3) upon expiration of the reconciliation cycle, deleting the pay item from the database and removing visibility of the "not-on-file" status.

13. The apparatus of claim 12, wherein the pay status deletion routine is further operable to delete the one or more pay items from a service management system database.

14. The apparatus of claim 12, wherein the return decision processing sub-module further comprises a credit transaction routine operable to create, automatically, one or more credit transactions and initiate, automatically, communication of the credit transactions to one or more demand deposit accounts associated with the one or more suspect pay items having the return decision.

15. The apparatus of claim 14, wherein the credit transaction routine is further operable to create, automatically, the one or more credit transactions, wherein the credit transactions include an account number, a check serial number and an amount.

16. The apparatus of claim 14, wherein the credit transaction routine is further operable to create, automatically, based on deletion of one or more pay items associated with the one or more return decisions from a database that indicates a pay status, one or more credit transactions.

17. The apparatus of claim 14, wherein the credit transaction routine is further operable to initiate, automatically, communication of the credit transactions via a transaction exchange to the one or more demand deposit accounts.

18. The apparatus of claim 12, wherein the return decision processing sub-module further comprises a return file routine operable to create, automatically, a return file that includes an identifier identifying the pay item being returned and a reason for the return.

19. The apparatus of claim 18, wherein the return file routine is further operable to initiate, automatically, communication of the return file to a return database.

20. The apparatus of claim 12, wherein suspect pay item client interface sub-module further comprises a client access platform operable to provide for the loading of the one or more suspect pay items on the platform.

21. The apparatus of claim 12, wherein the positive pay module further comprises a default decision processing sub-module operable to provide a client-defined default decision to one or more of the suspect pay items not having a received client decision within a predetermined time limit, wherein the client-defined default decision may be one of a pay decision or a return decision.

22. The apparatus of claim 21, wherein the return decision processing sub-module is further operable to process, automatically, the default decisions defined by the client as a return decision.

23. A computer program product, comprising:
a non-transitory computer-readable medium comprising:
a first set of codes for causing a computer to identify one or more suspect pay items by receiving a payment issue file, from a financial institution client, which includes information pertaining to a plurality of pending pay items and comparing the information in the payment issue file to information on received pay items;
a second set of codes for causing a computer to provide the one or more suspect pay items to an associated financial institution client;
a third set of codes for causing a computer to receive decisions on the one or more suspect pay items from the client, wherein one or more of the decisions is a return decision; and
a fourth set of codes for causing a computer to process, automatically, the one or more return decisions, including codes for causing the computer to credit one or more accounts associated with the one or more suspect pay items based on the one or more return decisions received form the client and codes for causing the computer to delete, automatically, one or more pay items associated with the one or more return decisions from a database that indicates a pay status by (1) assigning a temporary "not-on-file" status to each of the one or more pay items requiring deletion, (2) maintaining visibility of the "not-on-file" status for a reconciliation cycle, and (3) upon expiration of the reconciliation cycle, deleting the pay item from the database and removing visibility of the "not-on-file" status.

24. The computer program product of claim 23, wherein the fourth set of codes is further operable to delete the one or more pay items from a service management system database.

25. The computer program product of claim 23, wherein the fourth set of codes is further operable to cause the computer to create, automatically, one or more credit transactions and initiate, automatically, communication of the credit transactions, to one or more demand deposit accounts associated with the one or more pay items having the return decision.

26. The computer program product of claim 25, wherein the fourth set of codes is further operable to create, automatically, the one or more credit transactions, wherein the credit transactions include an account number, a check serial number and an amount.

27. The computer program product of claim 26, wherein the fourth set of codes is further operable to cause the computer to create, automatically based on deletion of one or more pay items each associated with the one or more return decisions from a database that indicates a pay status, one or more credit transactions.

28. The computer program product of claim 25, wherein the fourth set of codes is further operable to cause the computer to initiate, automatically, communication of the credit transactions via a transaction exchange to the one or more demand deposit accounts.

29. The computer program product of claim 23, wherein the fourth set of codes is further operable to cause the computer to create, automatically, a return file that includes an identifier identifying the pay item being returned and a reason for the return.

30. The computer program product of claim 29, wherein the fourth set of codes is further operable to initiate, automatically, communication of the return file to a return database.

31. The computer program product of claim 23, wherein the second set of codes is further operable to cause the computer to load the one or more suspect pay items on a client access platform.

32. The computer program product of claim 23, further comprising a fifth set of codes for causing a computer to acknowledge a failure to receive a decision from the client for one or more of the suspect pay items within a predetermined time limit, and prompt, automatically, a client-defined default decision, wherein the client-defined default decision is one of a pay decision or the return decision.

33. The computer program product of claim 23, further comprising a fifth set of codes for causing a computer to create, automatically, an audit report that includes client decisions and default decisions for the suspect pay items.

* * * * *